United States Patent [19]
Phaal

[11] Patent Number: 6,138,159
[45] Date of Patent: Oct. 24, 2000

[54] LOAD DIRECTION MECHANISM

[76] Inventor: Peter Phaal, 1639 9th Ave., San Francisco, Calif. 94122

[21] Appl. No.: 09/096,134

[22] Filed: Jun. 11, 1998

[51] Int. Cl.[7] .................................... G06F 15/173
[52] U.S. Cl. .......................... 709/226; 709/201; 709/220; 709/229
[58] Field of Search ...................... 709/226, 220, 709/229, 201; 714/4

[56] References Cited

U.S. PATENT DOCUMENTS

| | | | |
|---|---|---|---|
| 5,774,660 | 6/1998 | Brendel et al. | 709/201 |
| 5,812,668 | 9/1998 | Weber | 380/24 |
| 5,917,997 | 6/1999 | Bell et al. | 714/4 |
| 5,938,732 | 8/1999 | Lim et al. | 709/229 |
| 6,006,264 | 12/1999 | Colby et al. | 709/226 |

*Primary Examiner*—Mark H. Rinehart
*Assistant Examiner*—Ivan C. Pierce, III
*Attorney, Agent, or Firm*—Marc P. Schuyler

[57] ABSTRACT

This disclosure provides a transparent load direction mechanism between multiple host computers that enables continued processing of client requests notwithstanding failure of individual host computers. A client computer system is provided with two URLs for a given web site, including a primary URL and a reference URL; the reference URL is the generic address for the web site, and is used for bookmarks and URL display, e.g., "www.website.com;" the primary URL is used for actual communication with an assigned one of several parallel servers which service the web site, i.e., "www.website4.com." The client computer normally directs communications to the assigned server, but if a failure condition is detected, i.e., server "website4" goes off-line, the reference URL is used for re-entry to the web site and a new server assigned to service the client computer (i.e., "www.website2.com"). The disclosed mechanism is preferably implemented as a modified client browser, but it can be also be implemented elsewhere, such as in a communications node.

16 Claims, 3 Drawing Sheets

LOAD DIRECTION MECHANISM

The present invention relates to communications between computers and, more particularly, to enhancing service in applications where one computer receives and processes messages from other computers.

BACKGROUND

Several protocols exist in which one computer system (a "host" system) receives and processes messages from a number of other computer systems ("client" systems). For example, in applications involving the world-wide web, one server can receive and process many concurrent messages from different personal computers; in this example, the server would be the "host" system while each personal computer would be a "client" system. If a web site is very popular, or otherwise has large traffic, several servers can be arranged in parallel, and arrangements implemented for distributing work among them. Distribution of work, where a received message is allocated to a particular host computer, is referred to herein as "direction" of load. There are three common direction methodologies.

First, dispatcher methodology employs one host computer (the "dispatcher") to act as a designated point of contact for all communications between host and client. The dispatcher receives a message from a client, assigns a particular host computer, and routes that message and all subsequent messages to and from that particular host computer. If desired, the dispatcher can maintain a transaction list of sessions in-progress which matches host and client on a per session basis, such that messages for a session in-progress can be automatically routed to the same host computer. As should be apparent, however, dispatcher methodology requires all messages to pass through the dispatcher, which can create a bottleneck.

Second, round-robin methodology has been developed as a partial solution to the bottleneck problem. Round-robin methodology calls for a designated host computer to act as a single point of entry to the host system only, with initial messages being assigned (or "handed-off") to a particular host computer; unlike the dispatcher methodology, subsequent messages in a round-robin system (following initial assignment of a host computer) are transmitted directly between the assigned host computer and the client system, without going through the single point of entry. Round-robin methodology largely avoids the bottleneck problem but suffers from several shortcomings; if the single point of entry goes off-line, there may be no way for a new client to access a particular host system. Furthermore, if an assigned host computer is used by the client system to bookmark a particular host system, then load balancing problems may result, as individual clients later contact individual host computers directly. Also, if an assigned host computer goes off-line, a client may be unable to obtain continued service, e.g., it may be difficult to find the point of entry to the host system and thereby submit a new request for service. For these reasons, round-robin methodology does not provide optimal re-direction.

Finally, a hybrid round-robin methodology uses multiple parallel host computers which can each serve as a point of entry to the host system. This methodology avoids a single point of entry to a host system, and can permit entry into a host site if a single processing computer goes off-line; hybrid round-robin methodology addresses shortcomings associated with having a single point of entry only (i.e., each host computer can be used to enter a web site and can perform re-direction). However, hybrid round-robin methodology does not provide a mechanism for addressing the bookmark problem, and for providing ready address to a host system if an assigned host computer becomes unavailable.

A need exists for a host processing system that provides for service when a particular host computer suddenly becomes unavailable. Ideally, such a system should have a mechanism for also maintaining load balance among host computers during hand-off of work. Further still, a need exists for a system that maintains memory of a reference processing point for the host processing system, such that a client system can always approach a host processing system anew. Such a system should permit a client to bookmark a general site for a host processing system, such that later attempts to access the host processing system result in new re-distribution to an appropriate host processing computer. The present invention solves these needs and provides further, related advantages.

SUMMARY

The present invention provides a mechanism that directs client messages in the event of a failure of communications with a host processing system. As such, the present invention provides more consistent web site access, notwithstanding the failure of one or more host processing computers. As can be seen, therefore, the present invention provides a mechanism that improves reliability in processing web transactions and promotes quality of service.

One form of the present invention provides a load direction mechanism used to direct messages from a client computer system to one or more computers of a host processing system. The host processing system can be a web site, supported by one or more servers arranged in parallel, and can use dispatcher, round-robin, hybrid round-robin, or other configurations similar to those previously discussed. The host processing system has an associated reference address and at least a first host computer having a first address.

More particularly, this first form of the invention can be implemented as instructions and machine readable media; these can, for example, be implemented as a client browser program which is stored on a personal computer. The instructions direct a computer system to store both the reference address and the first address; preferably, the first address is stored as a primary URL address that is used to address all communications from the client computer system to the host processing system. The reference address, on the other hand, is preferably maintained as a backup or reference URL, and is used for bookmark functions, URL display, and attempts to access the host processing system in the event of failure of communications with the first host computer. By using the reference address for bookmarks, notwithstanding that communications are sent using the first address, future attempts to access the host processing system will be efficiently allocated, e.g., by assignment of a new host computer by a dispatcher or other point of entry to a web site. The reference address can be a generic address for the web site, as well as the address of a specifically assigned backup host computer.

The instructions also monitor processing of messages from the client computer system by the first host computer. If a communications failure is detected, for example, because a particular host computer fails to respond within a predetermined period or to respond to repeated message transmissions, the instructions then use the reference URL to submit the client request. In optional features of this form of the invention, more than one reference URL can be used such that, if communication is lost, the client computer system can backtrack and re-enter the host processing system through a generic point of entry. The detection function and use of reference URLs can also be implemented in a communications node, for example, a proxy for multiple client computer systems.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 shows a client computer system, a host processing system having multiple servers, a communications node coupling the client computer system and the host processing system, and software used to implement load direction.

FIG. 4 indicates both operation using a reference URL as well as alternative, automatic use of a stack of URLs to re-establish processing and communications.

FIG. 6 indicates in dashed lines that polling software may be independently stored on multiple servers, e.g., as with a hybrid round-robin configuration.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular examples set out below are the preferred specific implementations of a load direction mechanism, namely, which provides a modified browser, or communications node or server software for handling failures of communication. The invention, however, may also be applied to other types of systems as well.

In accordance with the principles of the present invention, the preferred embodiment is a load direction mechanism used to facilitate processing by a host processing system. One implementation of this load direction mechanism is illustrated in FIG. 1, which generally shows a host-processing system for an application involving the world wide web.

Figure 1:
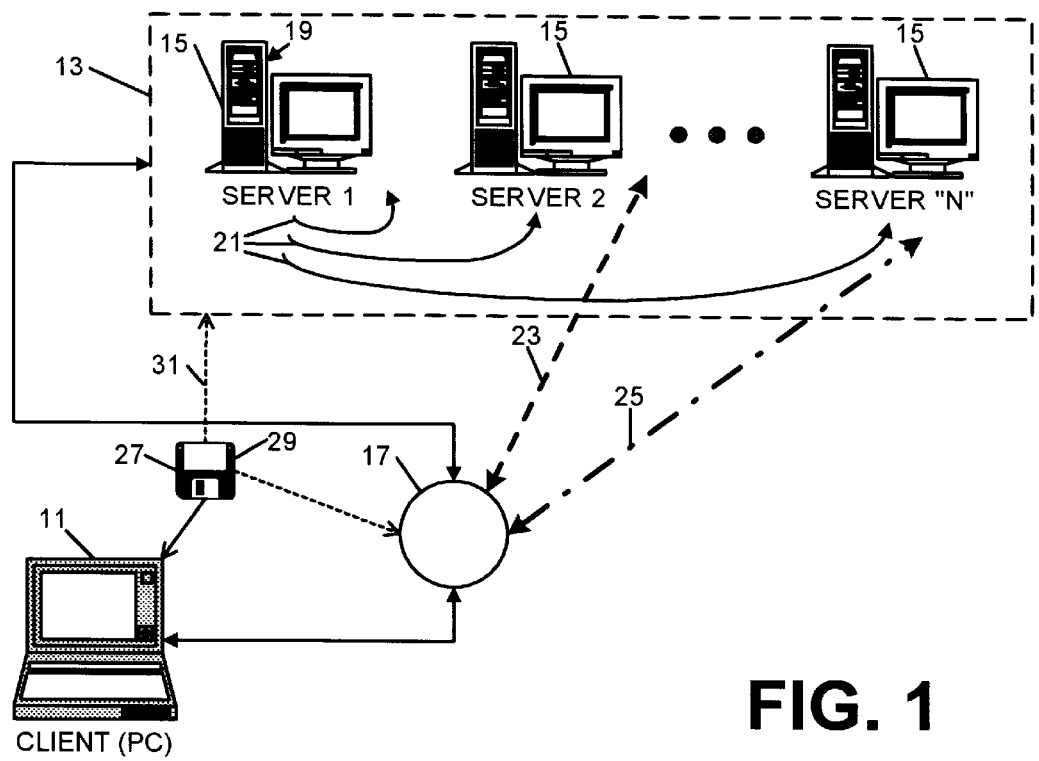
FIG. 1 is an illustrative diagram used to explain re-direction embodying principles of the present invention; in particular.

As illustrated in FIG. 1, a client computer system 11 (a personal computer, or "PC") is being used to contact a web site, indicated by a dashed line box and the reference numeral 13. The web site includes one or more servers 15, each designated as a server numbered from 1 to N, that service the web site. That is to say, each server provides similar functions and processing from the standpoint of the client. For example, each server may be geographically distributed, such that processing can be locally handled, such as in ordering products or obtaining software. A request for access to the web site is transmitted through one or more communications nodes 17 (usually proxies or routers), which use a Uniform Resource Locator ("URL") or internet protocol address ("IP address") to find the particular web site 13 and to route the particular client request to that site. The web site may include a dispatcher server, or a web page that permits the client to select from one or more available servers. In the particular example indicated in FIG. 1, "SERVER 1" (designated by the reference numeral 19) initially receives the client request and routes the client to one of the 1–N servers 15, as indicated by hand-off arrows 21. Once the request has been distributed, all processing related to a current session between the particular client and the web site is normally handled by a single one of the servers 15. This relationship is indicated by dashed lines, 23 and 25, which respectively indicate direct connection between the client and either "SERVER 2" or "SERVER N," respectively.

In the preferred embodiment, load direction is implemented with the assistance of instructions stored on machine readable media 27. The media is represented by a disk in FIG. 1, but it can be any type of machine readable media such as a hard disk within the client 11, for example. The instructions can also implement load direction on a communications node 17, or on the web site 13, or any of its servers 15 (all as indicated by dashed lines 29 and 31).

More specifically, the preferred embodiment includes both a browser program, such as a modified version of popular programs available from Netscape of Mountain View, Calif. or Microsoft of Redmund, Wash., as well as software stored on one or all of the servers 15. Contrary to conventional wisdom, the browser program is configured to use two URLs, including a primary URL and a reference or backup URL. The software stored on the server(s) is configured to, at least when it hands-off a client request to one of the 1–N servers, provide the client with an indication of the fact that the client is being handed-off, such that the client uses a URL for its assigned server (one of the servers 1–N) as the primary URL, but also stores a URL for entering the web site as the reference URL. Preferably also, in systems which support a stateless protocol, every host message sent to the client includes fields of the primary URL as well as the reference URL. The primary URL is preferably not displayed to a user, nor used for bookmark features of the browser program, but is used instead (in a manner transparent to a user of the client system) in addressing all communications from the client 11 to the web site 13 which are associated with the particular session. The reference URL is preferably a generic web site URL, and is the URL which is displayed to the client's user and used for bookmark applications, such that if the client later contacts the web site 13 for a new, unrelated session, it will newly be assigned one of the 1–N servers depending on their loads and availability. The browser program is also configured to automatically detect a failure of communication during a current session, and responsively automatically re-establish contact with the web site using the reference URL.

Figure 2:
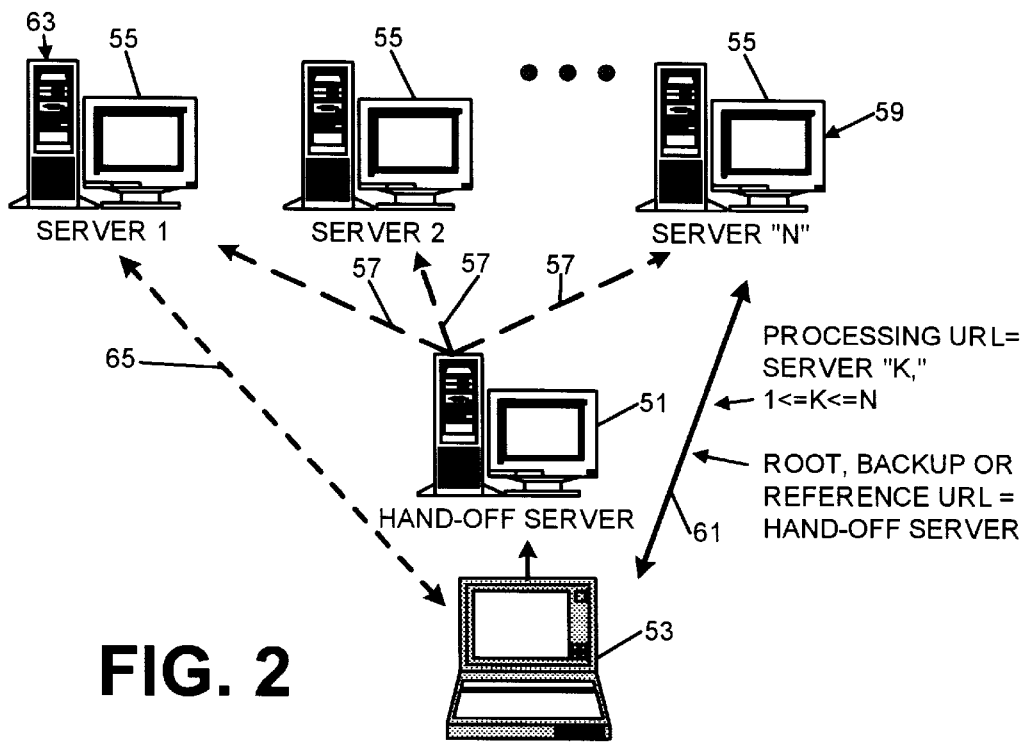
FIG. 2 is a diagram of a system similar to FIG. 1, but which shows use of a hand-off server which serves as an initial point of contact for a web site, such as might be used in a round-robin configuration.

FIG. 2 illustrates a configuration similar to that seen in FIG. 1, namely, where a hand-off server 51 or dispatcher is illustrated as routing requests from a client 53. In the embodiment indicated in FIG. 2, the hand-off server can also perform load balancing, such that for example, it randomly assigns loads or weights load allocation based on periodic polling of each of 1–N servers (each designated by the numeral 55 in FIG. 2) to determine the relative loads and availability of those servers. In the latter case, requests can be allocated to particular server on a dynamic basis, e.g., the hand-off server can (if current load statistics are available) weight assignments of new sessions toward those servers which are the least busy. Allocating messages on this basis helps ensure high quality of service, such that clients do not have to wait long for responses from the assigned server and can complete sessions on a timely basis.

As an example, a request from the client 53 which begins a new session with a web site may be allocated to one of the 1–N servers, as indicated by one of several dashed hand-off lines 57. In this particular hypothetical, the hand-off server 51 automatically assigns "SERVER N" (designated in FIG. 2 by reference numeral 59) to transact the particular session on behalf of the web site. Each communication from the hand-off server 51 or SERVER N 59 provides a response to the client 53 which both indicates a primary URL (identifying SERVER N to the client), and a reference URL which contains the address of the hand-off server 51. As indicated by a line 61 which directly connects SERVER N with the client, communications for the particular session normally occur directly between SERVER N and the client and do not pass through the hand-off server 51.

If communications are broken, however (as determined by a message from SERVER N that it is going off-line, or a failure to respond to the client within a predetermined time or repeated requests, or by another mechanism), the client again contacts the hand-off server 51 using the reference URL. In this hypothetical, the hand-off server 51 will treat this repeated contact as a request for a new session, and it will assign the request to a different server, SERVER 1, designated by reference numeral 63. [Using polling or broadcast software, as described below, the hand-off server 51 is presumably already aware that SERVER N is not available, and in such an instance, will necessarily assign a different server to process new requests.] As indicated by line 65, SERVER 1 and the client then communicate directly with each other (also with a reference URL which again points to the hand-off server 51).

There are many ways of performing load direction according to the present invention, e.g., on applications other than the world wide web, on dispatcher, round-robin, hybrid round-robin or other configurations, using software implemented entirely on a server, node or client; as an example, routine round-robin methodology can be applied for initial load assignment, and a reference URL or other backup address being implemented only at the level of an assigned server to achieve load re-direction in the event of communications.

Figure 3:
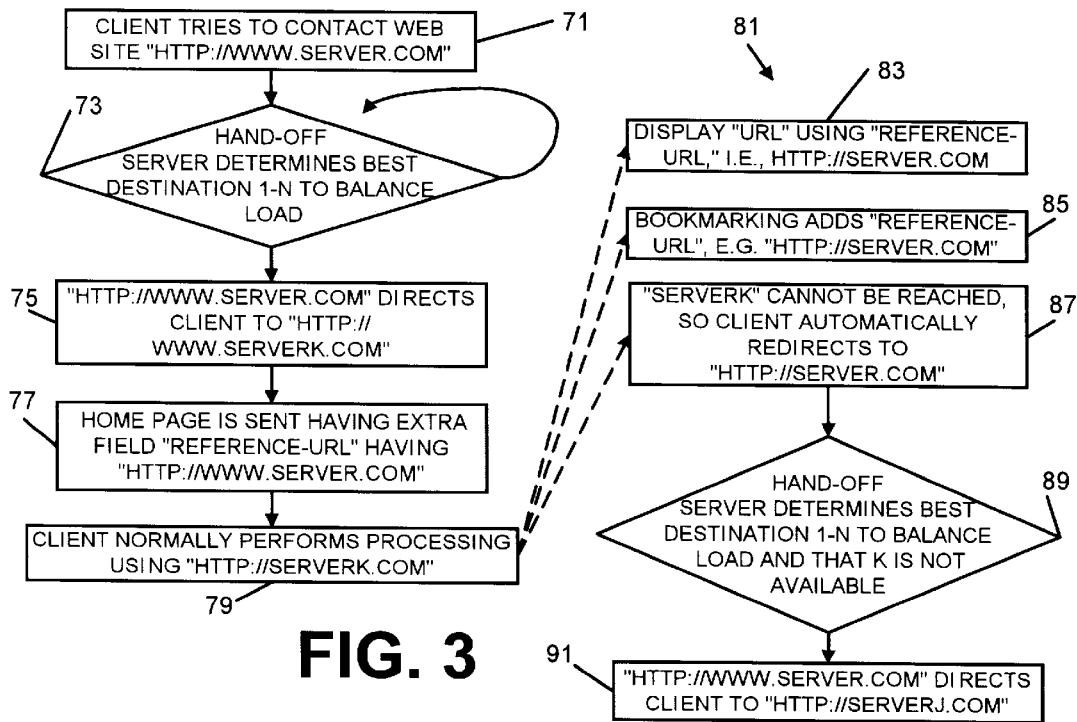
FIG. 3 is a block diagram indicating system operation, including normal operations using a primary URL (seen at the left side of FIG. 3), and operations using a reference URL (seen at the right side of FIG. 3), such as for bookmark operations, URL display, and continued processing by the host processing system in case of communications failure.
Figure 4:
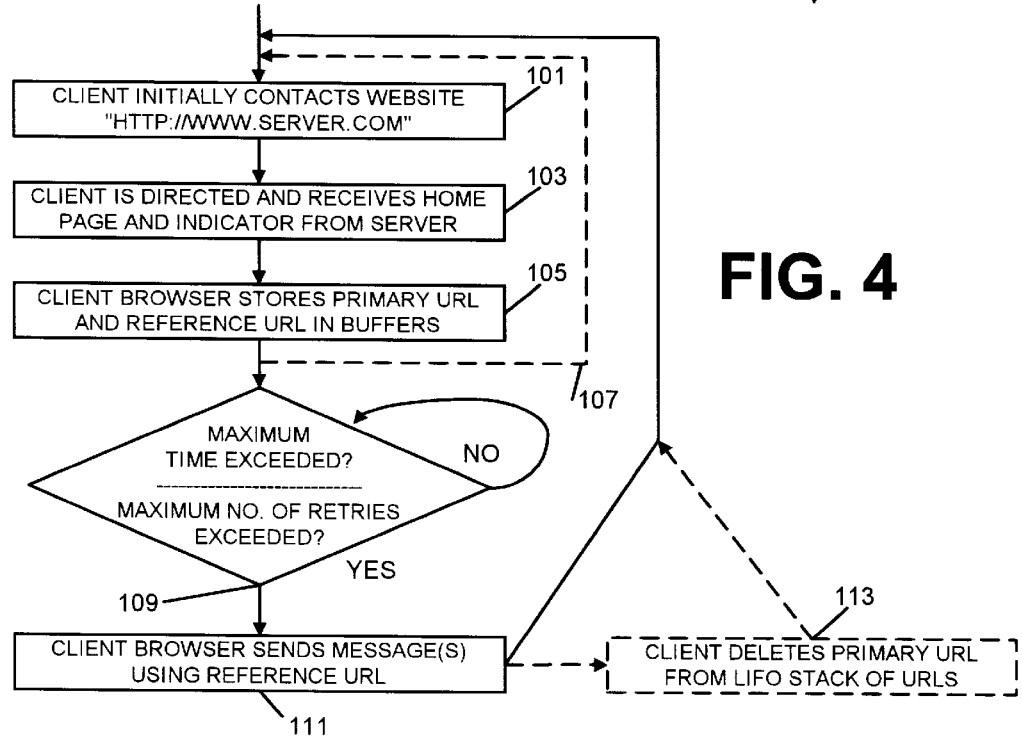
FIG. 4 is a block diagram indicating operation of software stored on a client computer system, preferably as part of a modified browser.
Figure 5:
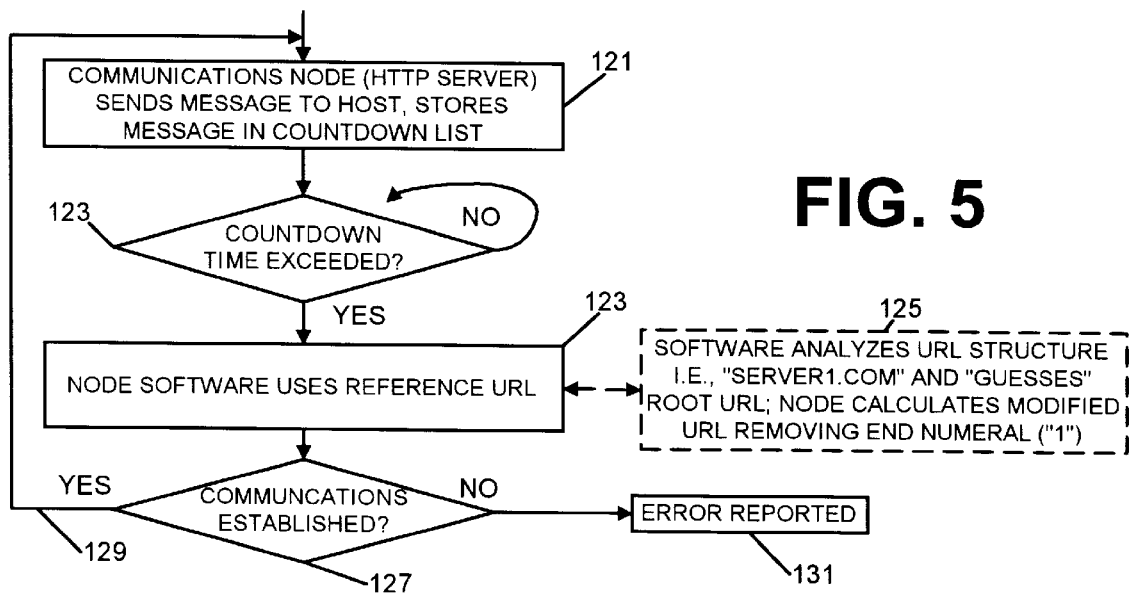
FIG. 5 is a block diagram indicating operation of software on a communications node (for example, a proxy) where use of a reference URL is established at the proxy, in a manner that is transparent to a client computer system; upon ascertaining a failure of communications, the node can either uses a specific reference URL or can attempt to "guess" a URL to re-establish communications if no reference URL is available.
Figure 6:
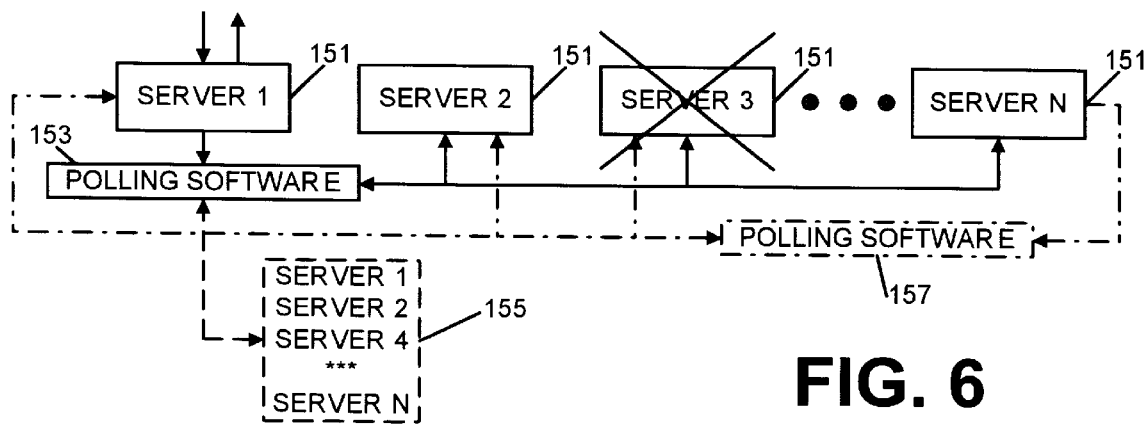
FIG. 6 is a block diagram of a host processing system having N servers and polling software which periodically determines server availability and load, to develop a prioritized list; while normally used in initially assigning servers to particular sessions, the polling software can also be used to initially provide one or more reference URLs in case of failure of one communications with a server.
Figure 7:
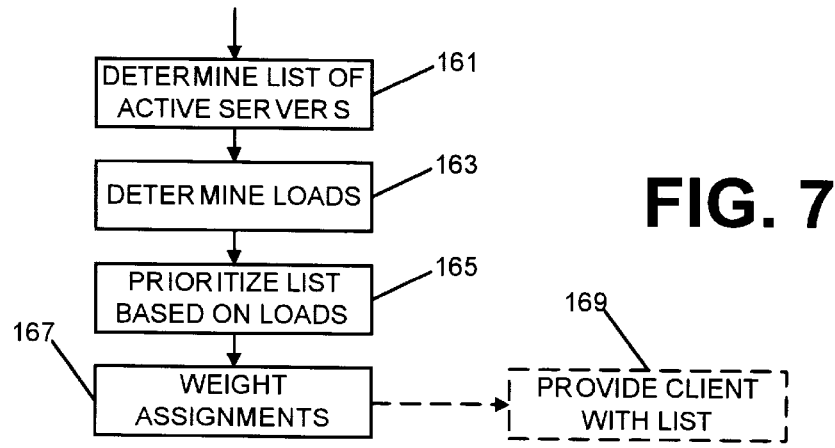
FIG. 7 is a block diagram indicating operation of the polling software of FIG. 6.

The following description, referring to FIGS. 3–5 describe how software preferably operates from a systems standpoint, and in embodiments resident on a client computer and a communications node in between a client and a server, respectively. A communications node can, for example, be a server itself, such as a network of computers operating at a company, a special purpose proxy server, a routing device, or other network element. FIG. 6 is used to describe software which can be implemented on one or more servers associated with a particular host processing system, while FIG. 7 is used to describe one way that load balancing may be implemented on a host processing system.

FIG. 3 is used to explain preferred load direction from a systems standpoint. More particularly, a modified client browser program operates to display web pages to a user of the client, to permit the user to navigate the world wide web and to regulate (from the standpoint of the client system) communications to a web site. As indicated by a first function box 71, the client system contacts a desired web site by using a URL such as "http://www.server.com." The URL can be supplied directly by the client's user, or can be automatically selected when the user "clicks" on a visual indicator that has a hypertext link. When the client system has contacted the web site, a hand-off server selects a particular host computer for servicing the client, as indicated by decision block 73. In response to this selection, the client is load directed to a particular host computer, for example, "http://www.serverk.com," as indicated by function block 75 of FIG. 3. At this point, the client system is sent a message (such as a home page for the web site) which in its header information identifies both a primary URL (i.e., "http://www.serverk.com") as well as a reference URL (i.e., "http://www.server.com"), as indicated by function block 77 in FIG. 3. The client browser performs processing and web navigation in a normal, well-known manner, as indicated by reference numeral 79, but stores the reference URL in a special buffer, which can be overwritten as the user of the client system navigates the web. If desired (particularly in a stateless protocol), the client can be sent two reference URLs including one for the generic web site (e.g., for bookmarks and user display) and an address for backup processing. For the present discussion, it will be assumed that only one reference URL is sent.

A right hand side of FIG. 3, designated generally by the reference numeral 81, illustrates use of a reference URL. As with most current client browser programs, a URL is displayed which indicates the web site currently being accessed by the client system. Normally, the browser program would simply display the precise URL by which the web site was accessed; however, in accordance with principles of the present invention, a preferred client browser program instead uses a reference URL (i.e., "http://www.server.com," reflecting a generic address for the web site) instead of the precise URL by which the web site was accessed (i.e., "http://www.serverk.com"). This operation is indicated by the reference box 83 in FIG. 3.

In addition, client browser programs normally feature a bookmark feature, which cause the displayed URL to be stored in memory of the client system in case the user decides to access the same web site at a later time. In conventional client browser programs, this operation would cause a URL for the specific, assigned host computer to be added as a bookmark instead of a generic bookmark representing the web site. However, as indicated by reference numeral 85 of FIG. 3, a browser program implementing principles of the present invention preferably causes a reference URL, e.g., a generic web site address, to be added as a bookmark, notwithstanding any assigned host computer. Accordingly, later attempts from the client to gain access to the web site are routed through a dispatcher or other initial point of entry to the web site, and may be routed to an available host computer.

As indicated by block 87 of FIG. 3, the preferred client browser program also includes software which monitors responses to client requests; if a response is not received from an assigned host computer, the preferred browser program automatically returns to the web site entry point by using a reference URL or switches to a different host computer. Detection of a failure of communications in this manner can be implemented in a variety of ways, such as in response to a particular message sent by a host computer, expiration of a time period during which the assigned host computer has failed to respond, and by failure of an assigned host computer to respond to a predetermined number of repeat client messages. In an alternative embodiment, detection of a failure of communications, and switching to a reference URL, can be implemented at a communications node (e.g., in an HTTP server to which the client system is connected). When the client system contacts a reference URL which is a web site entry point (e.g., a dispatcher), the web site preferably treats the client request as a request for a new session, and performs hand-off and load direction anew, as indicated by blocks 89 and 91 of FIG. 3.

FIG. 4 illustrates operation of a preferred client browser program which implements principles of the present invention. As indicated by function blocks 101 and 103, the client browser program formats a message for initially contacting the desired web site, and responsively receives a web page and indicator from a responding host computer. The indicator preferably is a field in a header the web page, which the client browser program recognizes as designating the presence of a reference URL; accordingly, the client browser program stores the primary URL and reference URL in dedicated buffers, as indicated by function block 105, and provides well-understood, conventional web browsing functions. As indicated by dashed line 107, the client browser program can be controlled to contact other web pages, in which case the functions 101, 103 and 105 can be performed with respect to a newly contacted web site.

A decision block 109 implemented in the browser program is used to ascertain a failure of communications. Preferably, processing continues using the primary URL unless the assigned host computer fails to respond within a predetermined time period, usually on the order of a number of seconds. If desired, the browser program can be instructed once the predetermined time period has expired to resubmit the most recent client message a second or additional times, with a failure being ascertained when predetermined criteria have been met. If a failure in communications is detected, the browser program contacts a reference URL, which as previously mentioned can be the generic web site address, as indicated by function block 111; in a stateless protocol, a reference URL can also be a specific other server for processing the next client request. Preferably, all of the processing represented by FIG. 3 other than web site contact itself is performed transparently to the client.

In an alternative embodiment, the client's browser program can be configured to accept a last-in, first-out ("LIFO") stack of URLs, one of which can be designated as the generic address for use as a bookmark. Such a list could be transmitted, for example, in a backup header for each message sent to the client. In the event of failure of communications, the browser simply uses the second most recent URL, and so on, as indicated by function block 113 of FIG. 3.

FIG. 5 illustrates an alternative embodiment where maintenance of a reference URL is performed at the level of a communications node, such as a proxy server which manages outgoing communications from a group of client systems. In particular, the communications node monitors communications from clients to a particular host computer and maintains a countdown timer associated with requests, all as indicated by function block 121 of FIG. 5. If no response is received within a predetermined amount of time, or in a manner such as has been previously described in connection with a preferred client browser program, the communications node detects an error, as represented by blocks 123 and 125. Importantly, software associated with the communications node can instruct the node to maintain a countdown timer and monitor response only for select client requests.

The communications node (as has been described above) can store reference URLs for each client system or look at header information to derive a reference URL. Alternatively, if a specific reference URL field is not included in message transmissions, the communications node can attempt to guess a generic URL in the event of a failure of communications, as represented by block 123 of FIG. 5. As indicated by function block 125, the guessing can be implemented in software using a desired algorithm, such as by removing suffix numeral from a URL (i.e., by deducing "http://www.server.com" from the address "http://www.serverk.com") or processing a detailed list of sequential rules for guessing a backup URL. In such event, in a manner transparent to the client, the communications node automatically switches the client to a generic URL. If such processing re-establishes communications (as indicated by decision block 127 and line 129), the client system can continue processing and again be routed into the desired web site. On the other hand, if the communications node is unsuccessful, it can then report an error to the client, as indicated by block 131. As was the case with the preferred client browser program, such processing is preferably performed in a manner that is transparent to the client's user.

Principles of the present invention may also be applied to the host processing system, as will be described with reference to FIGS. 6 and 7. In particular, FIG. 6 describes an implementation of load balancing at a web site, whereby entry points for the web site can be periodically informed of presently available host computers as well as (optionally) priority in load direction to achieve a balanced load distribution, such that host computers which are the least busy tend to receive new sessions.

FIG. 6 illustrates SERVERS 1–N (each designated by the reference numeral 151), and is used both to explain load balancing in a round-robin and hybrid round-robin arrangements. In a round-robin arrangement, polling software 153 can be optionally implemented on a module associated with a single server only (which is not necessarily the server associated with the designated point of entry, and which does not have to be a server which processes client requests). At a predetermined time, the polling software can interrogates each of SERVERS 1–N to determine their availability and present loads. Typically, such polling results in the return of a quantity which can be on a percentage or other scale, depending upon the particular server; if a particular server fails to respond, for example, if SERVER 3 is unavailable and fails to respond within a predetermined time, the polling software assumes that the particular server is unavailable. Based on the information acquired in this manner, the polling software compiles a weighted list 155 of available servers with servers which are least busy prioritized; as seen in FIG. 6, since SERVER3 is unavailable, it is not identified in the list, or is assumed to already have an excessive load. Load detection and weighting in a hybrid round-robin system is similar to that just described, but polling software can in such an embodiment can be independently associated with each server (as indicated by block 157), i.e., each server maintains its own weighted list. Such redundant processing is not strictly necessary in such an embodiment, and polling software preferably is implemented in a single system module which provides a weighted list to each server for use as point of entry and in load direction.

Alternatively, each machine may periodically broadcast its state; all other machines listen for the broadcasts or other machines, and identify which nodes are available. In fact, in many applications, it may be preferred to assign servers randomly to new sessions and, as a consequence, this "broadcast" scheme may often be a preferred alternative to the use of polling software.

FIG. 7 shows a list of tasks performed by software resident on a host processing system. In particular, as identified by blocks 161, 163 and 165, the server proceeds to determine active host computers, their relative loads, and develop a prioritized list based on loads. The host processing system then performs hand-off in a round-robin or other fashion using the weighted assignments, as identified by the block 167 of FIG. 7. In an alternative embodiment (in which the client maintains a LIFO list of reference URLs), the server can provide the client with the weighted list, such that the client can attempt multiple reference URLs in the event of a failure of communication with the primary URL. This latter embodiment (identified by the reference numeral 169) is considered advantageous, since a client system would not be required to re-enter a web site anew but can simply resume processing with a new server.

In view of the foregoing description, various alternative embodiments of the present invention will occur to those having skill in electronics. For example, various software alternatives will also occur to those having programming skill which effects deferral of messages without departing from the spirit of the present invention. The preferred client browser program, communications node and server software, above, are typically implemented primarily in code having various arrangements of routines and subroutines, but some of these functions could also be implemented in hardware or firmware. Other mechanisms for assisting load direction on the client side, the communications node or server side, may be used instead of the mechanisms described above.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. For use in routing communication between a client computer system and multiple servers associated with a host processing system, where a reference address is associated with the host processing system and a specific address is associated with each server, a load direction mechanism comprising:

a resource assignment mechanism associated with the reference address that assigns one of the servers to process communications between the client computer system and the host processing system, the resource assignment mechanism using a predetermined load assignment protocol in making the assignment;

a browser maintained by the client computer system, the browser receiving and storing both of the specific address for the assigned server and the reference address, the browser normally using the specific address to direct communication with the host processing system to the assigned server; and a monitoring mechanism that detects at least one of
an event where the assigned server fails to respond to the client computer system, and
an event where the client computer system is requesting a new session; wherein the monitoring system responsive to a detected event causes the browser to direct communication to the reference address instead of to the specific address;

wherein balanced load direction and session-completion are facilitated by having the resource assignment mechanism newly assign a server to communicate with the client computer system, notwithstanding that prior direct processing between the client computer system and the host processing system was effected using the specific address.

2. A load direction mechanism according to claim 1, wherein the browser is configured to normally bookmark only the reference address for the host processing system, notwithstanding use of the specific address for communication by the client computer system contemporaneous with bookmarking.

3. A load direction mechanism according to claim 1, wherein the browser is configured to normally display only the reference address for the host processing system, notwithstanding concurrent use of the specific address for communication by the client computer system.

4. A load direction mechanism according to claim 1, wherein the monitoring mechanism detects an event that the assigned server has failed to respond to the client computer system if a time-out condition occurs.

5. A load direction mechanism according to claim 1, wherein the monitoring mechanism detects an event that the server has failed to respond to the client computer system if a predetermined number of requests have been made by the client computer system without response from the assigned server.

6. A load direction mechanism according to claim 1, wherein the monitoring mechanism detects an event that the client computer system is requesting a new session if a bookmark has been activated.

7. A load direction mechanism according to claim 1, wherein the host processing system further includes a means for at least periodically indicating to the resource assignment mechanism whether each server associated with the host processing system is operational.

8. A load direction mechanism according to claim 1, wherein the host processing system further includes a polling mechanism that determines relative load of each server and that feeds relative load information back to the resource assignment mechanism for use in accordance with a predetermined load balancing protocol.

9. A method of directing loads addressed to a host processing system among multiple servers of the host processing system, said method comprising:

using a resource assignment mechanism to originally assign a client message that begins a new session to one of the multiple servers;

handing-over processing for the session dirty to the assigned server, such that communication relating to the session normally occurs between a client and the assigned server without further invoking the resource assignment mechanism;

specifically causing the client to store both a specific address associated with the assigned server for use in directing normal communications with the host processing system relating to the session, as well as a reference address associated with the host processing system; and detecting at least one of
an event where the assigned server fails to respond to the client, and
an event where the client is requesting a new session;

responsive to a detected event, causing the client to use the reference address instead of the specific address in communicating with the host processing system.

10. A method according to claim 9, further comprising providing a bookmark function to the client that causes the reference address to be stored as a point of contact for the host processing system, notwithstanding communication using the specific address that is contemporaneous with bookmark formation, such that future activation of the bookmark will cause the future communications from the client originating through activation of the bookmark function to the resource assignment mechanism.

11. A method according to claim 9, further comprising causing the client to display the reference address, notwithstanding that contemporaneous communication between the client and the assigned server relating to a session is accomplished using the specific address and not the reference address.

12. A method according to claim 9, wherein detecting an event where the assigned server fails to respond to the client includes detecting a time-out condition.

13. A method according to claim 9, wherein detecting an event where the assigned server fails to respond to the client includes detecting a predetermined number of repeat requests without response from the assigned server.

14. A method according to claim 9, wherein detecting an event where the client is requesting a new session includes detecting activation of a bookmark for the host processing system.

15. A method according to claim 9, further comprising at least periodically updating the resource assignment mechanism as to whether each server associated with host processing system is operational.

16. A method according to claim 9, further comprising polling those servers associated with the host processing system to determine their relative load and that feeding relative load information back to the resource assignment mechanism for use in accordance with a load balancing protocol.

* * * * *